(12) United States Patent
Engler et al.

(10) Patent No.: US 6,570,700 B2
(45) Date of Patent: May 27, 2003

(54) MICROSTRUCTURES WITH ASSISTING OPTICAL ELEMENTS TO ENHANCE AN OPTICAL EFFECT (75) Inventors: David A. Engler, Woodbury, MN (US); Rolf W. Biernath, Wyoming, MN (US); John C. Nelson, The Sea Ranch, CA (US)

(73) Assignee: 3M Innovative Properties Company, St. Paul, MN (US)

( * ) Notice: Subject to any disclaimer, the term of this patent is extended or adjusted under 35 U.S.C. 154(b) by 182 days.

(21) Appl. No.: 09/805,810

(22) Filed: Mar. 14, 2001

(65) Prior Publication Data

US 2002/0131148 A1 Sep. 19, 2002

(51) Int. Cl.[7] .............................................. G02B 26/00
(52) U.S. Cl. ...................................... 359/296; 359/290
(58) Field of Search ................................ 359/296, 452, 359/253; 345/105, 107, 108, 111, 84; 204/450, 600, 606, 622, 477, 485

(56) References Cited

U.S. PATENT DOCUMENTS

| | | | |
|---|---|---|---|
| 3,612,758 A | 10/1971 | Evans et al. | 348/803 |
| 4,126,854 A | 11/1978 | Sheridon | 345/107 |
| 4,261,653 A | 4/1981 | Goodrich | 359/296 |
| 4,290,174 A | 9/1981 | Kalleberg | 24/444 |
| 4,438,160 A | 3/1984 | Ishikawa et al. | 427/214 |
| 5,077,870 A | 1/1992 | Melbye et al. | 24/586.11 |
| 5,201,101 A | 4/1993 | Rouser et al. | 24/575 |
| 5,262,098 A | 11/1993 | Crowley et al. | 264/8 |
| 5,344,594 A | 9/1994 | Sheridon | 264/4.1 |
| 5,389,945 A | 2/1995 | Sheridon | 345/85 |
| 5,737,115 A | 4/1998 | Mackinlay et al. | 359/296 |
| 5,751,268 A | 5/1998 | Sheridon | 345/107 |
| 5,754,332 A | 5/1998 | Crowley | 359/296 |
| 5,760,761 A | 6/1998 | Sheridon | 345/107 |
| 5,777,782 A | 7/1998 | Sheridon | 359/296 |
| 5,815,306 A | * 9/1998 | Sheridon et al. | 345/107 |
| 5,825,529 A | 10/1998 | Crowley | 359/296 |
| 5,982,346 A | 11/1999 | Sheridon et al. | 345/85 |
| 6,055,091 A | 4/2000 | Sheridon et al. | 359/296 |
| 6,128,124 A | 10/2000 | Silverman | 359/296 |
| 6,147,791 A | * 11/2000 | Sheridon | 345/10 |
| 6,222,513 B1 | 4/2001 | Howard et al. | 345/84 |
| 6,392,786 B1 | 5/2002 | Albert | 359/296 |
| 6,396,621 B1 | 5/2002 | Sheridon | 359/296 |

FOREIGN PATENT DOCUMENTS

| | | |
|---|---|---|
| EP | 0 902 410 A2 | 9/1998 |
| EP | 0 935 230 A2 | 5/1999 |

* cited by examiner

*Primary Examiner*—Georgia Epps
*Assistant Examiner*—M. Abutayeh
(74) *Attorney, Agent, or Firm*—Stephen W. Buckingham (57) ABSTRACT A microstructure to interact with electromagnetic waves by changing optical aspect in selected areas in response to an external signal, the microstructure comprising: a plurality of responsive elements, each responsive element capable of presenting at least two different optical aspects and changing between the optical aspects based on an applied external signal; and a support substrate containing the responsive elements, wherein at least a part of the support substrate defines an optical structure containing a plurality of assisting optical elements each optically enlarging an image from the responsive elements associated with the assisting optical element.

42 Claims, 3 Drawing Sheets

MICROSTRUCTURES WITH ASSISTING OPTICAL ELEMENTS TO ENHANCE AN OPTICAL EFFECT

CROSS-REFERENCE TO RELATED APPLICATIONS

None.

BACKGROUND OF THE INVENTION

The present invention relates to microfabricated structures to interact with electromagnetic waves and, more particularly to addressable, reusable visual displays. Still more particularly, an embodiment of the invention relates to preformed microstructured substrates containing assisting optical elements to enhance the visual effect of visual displays, such as gyricon displays using rotatable particles (e.g., rotary balls).

For purpose of illustration, the present application uses structures of gyricon displays to demonstrate the concepts and the benefits of the inventive structure.

A gyricon display, also called a twisting-particle display, rotary ball display, particle display, dipolar particle light valve, etc., is a type of addressable visual displays. A gyricon display offers a technology for making a form of electric paper and other reflective displays. Briefly, a gyricon display is an addressable display made up of a multiplicity of optically anisotropic particles, with each particle being selectively rotatable to present a desired face to an observer. The rotary particle can be of various shapes, such as spherical or cylindrical. For convenience, balls, rather than cylinders, are used in this description for illustrations.

Addressable visual displays typically have multiple display units such as pixels or subpixels. A separate assisting optical element is sometimes used in connection with each display to enhance or create certain visual effect. U.S. Pat. No. 5,777,782 to Sheridon, for example, discloses a gyricon or rotating-particle display having an auxiliary optical structure which is a pre-formed array of lenses indexed to gyricon particles. Although the Sheridon patent relates to gyricon displays only, in principle the use of an auxiliary optical structure is not limited to the gyricon displays. A properly designed auxiliary optical structure may be used to enhance or create certain visual effects in other types of visual displays containing multiple display units, such as displays using electronic ink based on the electrophoretic principle made by E Ink Corp. For purpose of illustration, however, the present application uses structures of gyricon displays to demonstrate the concepts and the benefits of the inventive structure.

A gyricon display, also called a twisting-particle display, rotary ball display, particle display, dipolar particle light valve, etc., offers a technology for making a form of electric paper and other reflective displays. Briefly, a gyricon display is an addressable display made up of a multiplicity of optically anisotropic particles, with each particle being selectively rotatable to present a desired face to an observer. The rotary particle can be of various shapes, such as spherical or cylindrical. For convenience, balls, rather than cylinders, are used in this description for illustrations.

Like ordinary paper, electric paper preferably can be written on and erased, can be read in ambient light, and can retain imposed information in the absence of an electric field or other external retaining force. Also like ordinary paper, electric paper preferably can be made in the form of a lightweight, flexible, durable sheet that can be folded or rolled into tubular form about any axis and can be conveniently placed into a shirt or coat pocket and then later retrieved, restraightened, and read substantially without loss of information. Yet unlike ordinary paper, electric paper preferably can be used to display full-motion and changing images as well as still images and text. Thus, it is particularly useful for bistable displays where real-time imagery is not essential, but also adaptable for use in real-time imaging such as a computer display screen or a television.

A gyricon display, also called a twisting-particle display, rotary ball display, particle display, dipolar particle light valve, etc., offers a technology for making a form of electric paper and other reflective displays. Briefly, a gyricon display is an addressable display made up of a multiplicity of optically anisotropic particles, with each particle being selectively rotatable to present a desired face to an observer. The rotary particle can be of various shapes, such as spherical or cylindrical. For convenience, balls, rather than cylinders, are used in this description for illustrations.

In the prior art, the black-and-white balls (particles) are embedded in a sheet of optically transparent material, such as an elastomer sheet. The elastomer sheet is then cured. After curing, the elastomer sheet is placed in a plasticizer liquid, such as a dielectric fluid. The dielectric plasticizer swells the elastomer sheet containing the particles creating cavities larger than the particles around the particles. The cavities are also filled with the absorbed dielectric fluid. The fluid-filled cavities accommodate the particles, one particle per cavity, so as to prevent the particles from migrating within the sheet.

Besides being optically anisotropic, the particles are electrically dipolar in the presence of the fluid. This may be accomplished by simply including in one or both hemispheres materials that impart an electrical anisotropy, or by coating one or both sides of hemispheres with materials that impart electrical anisotropy. The above charge activation agents may impart an electrical anisotropy and an optical anisotropy at the same time. For example, when each hemisphere of a gyricon particle is coated with a material of a distinct electrical characteristic (e.g., Zeta potential with respect to a dielectric fluid) corresponding to a distinct optical characteristic the particles will have an electrical anisotropy in addition to their optical anisotropy when dispersed in a dielectric liquid. It is so because when dispersed in a dielectric liquid the particles acquire an electric charge related to the Zeta potential of their surface coating.

An optically anisotropic particle can be selectively rotated within its respective fluid-filled cavity, for example by application of an electric field, so as to present either its black or white hemisphere to an observer viewing the surface of the sheet. Under the action of an addressing electric field, such as provided by a conventional matrix addressing scheme, selected ones of the optically and electrically anisotropic particles are made to rotate or otherwise shift their orientation within their cavities to provide a display by the selective absorption and reflection of ambient light. Since the particles need only rotate, not translate, to provide an image, much faster imaging response is achieved than with the display of U.S. Pat. No. 3,612,758.

When the electric field is applied to the sheet, the adhesion of each particle to the cavity is overcome and the particles are rotated to point either their black or white hemispheres towards the transparent surface. Even after the electric field is removed, the structures (particles in specific orientations) will stay in position and thus create a bistable display until the particles are dislodged by another electric field. An image is formed by the pattern collectively created by each individual black and white hemisphere. Thus, by the application of an electric field addressable in two dimensions (as by a matrix addressing scheme), the black and white sides of the particles can be caused to appear as the image elements (e.g., pixels or subpixels) of a displayed image. These bistable displays are particularly useful for remotely addressable displays that require little power to switch and no power to maintain display image for a long period of time (e.g., months).

Gyricon display technology is described further in U.S. Pat. No. 4,126,854 (Sheridon, "Twisting Ball Panel Display") and U.S. Pat. No. 5,389,945 (Sheridon, "Writing System Including Paper-Like Digitally Addressed Media and Addressing Device Therefor"). Further advances in black and white gyricon displays have been described in U.S. Pat. No. 6,055,091 (Sheridon, "Twisting-Cylinder Display"). The above-identified patents are all hereby incorporated by reference. The Sheridon patent disclosed a gyricon display which uses substantially cylindrical bichromal particles rotatably disposed in a substrate. The twisting cylinder display has certain advantages over the rotating ball gyricon because the elements can achieve a much higher packing density. The higher packing density leads to improvements in the brightness of the twisting cylinder display as compared to the rotating ball gyricon.

Gyricon displays are not limited to black and white images, as gyricon and other display mediums are known in the art to have incorporated color. Gyricons incorporating color have been described in U.S. Pat. No. 5,760,761 titled "Highlight Color Twisting Ball Display", U.S. Pat. No. 5,751,268 titled "Pseudo-Four Color Twisting Ball Display", U.S. patent application Ser. No. 08/572,820 titled "Additive Color Transmissive Twisting Ball Display", U.S. patent application Ser. No. 08/572,780 titled "Subtractive Color Twisting Ball Display", U.S. Pat. No. 5,737,115 titled "Additive Color Tristate Light Valve Twisting Ball Display", U.S. Pat. No. 6,128,124 titled "Additive Color Electric Paper Without Registration or Alignment of Individual Elements" and European Patent No. EP0902410 titled "Methods for Making Spinnable Ball, Display Medium and Display Device". The above-identified patents are all hereby incorporated by reference.

The above prior art all involve a process which is to randomly pack the bichromal particles in an elastomeric matrix, cure the elastomer, and subsequently swell the elastomer in the dielectric oil. The process is laborious and time-consuming, consisting of mixing of the particles into the elastomer, coating the slurry into a sheet format, curing, and subsequently swelling the sheet with the dielectric oil.

Furthermore, the display device of such an arrangement poses problems in connection with the selection of a usable dielectric liquid, stability upon changes in temperature, non-uniformity of dimensions of the cavities, and the like. The material considerations in the prior art are many, the primary issues being tuning the swelling of the elastomer by the dielectric oil without harming the dielectric oil compatibility with all the other elements of the display package.

Furthermore, the above approach resulted in less than satisfactory contrast of the display, associated with the relatively low reflectance of a gyricon display. It is commonly believed that the best way to improve the reflectance of a gyricon display is to make the display from a close packed arrangement of bichromal particles. The closer packed the arrangement of particles, the better the reflectance and the brighter the appearance of the display. To achieve a close packed arrangement, the cavities in which the particles rotate should be close to each other and each cavity should have little unfilled space when filled with a particle, ideally no more empty space than what is necessary to keep the particle therein rotatable. The prior art approaches, however, had difficulties to achieve a high density of particles, mainly due to the lack of controlling on the formation of individual cavities. The result is typically that cavities are either too large, or distributed too loosely in the elastomer with large distances and thick walls between the individual cavities, making it difficult to control the arrangement and packing density of the display particle members to a sufficiently high value to achieve a display of high quality, high resolution, and high contrast.

As a related problem, in a typical conventional gyricon display, bichromal particles are dispersed throughout the thickness of the substrate sheet, which is always thicker than two particle diameters and is usually many diameters thick. Generally, less than 20 percent of the upper surface area of the sheet is covered by the bichromal particles in the layer closest to the surface. Therefore, a display according to the above prior art has multiple layers of particles instead of a single layer, making the display thick and bulky, an undesirable feature especially for an electronic paper. In the prior art designs, the multiple layer configuration is on one hand necessary in order to increase the reflectance (the reflectance of multiple layers of loosely packed particles accumulatively approaches that of a closely packed single layer) and on the other hand difficult to avoid due to the characteristics of the prior art process of making a display.

To achieve higher packing density, the above method was modified in U.S. Pat. No. 4,438,160 to Ishikawa et al, which patent is incorporated by reference. In the Ishikawa patent, instead of using the swelling method to create cavities larger than the particles, the particles are coated with a layer of wax before being placed in the elastomer. The wax is later melted away, resulting in cavities that are larger than the particles. Presumably, because it is easier to control the thickness of the wax layer coated on the particles than to control the degree of swelling the elastomer, it is also easier to achieve higher density of particles by using the Ishikawa method. The actual improvement, however, is not significant enough to solve the problem. See U.S. Pat. No. 5,825,529 to Crowley, which patent is incorporated by reference.

To achieve still higher packing density, a gyricon display can be constructed without elastomer and without cavities. U.S. Pat. No. 5,825,529 to Crowley, for example, uses no elastomer substrate. In the display in the Crowley patent, the bichromal particles are placed directly in the dielectric fluid. The particles and the dielectric fluid are then sandwiched between two retaining members (e.g., between the addressing electrodes). There is no elastomer substrate. Electrodes serve both to address particles and to retain particles and fluid in place. Particles and fluid can be sealed in the display by seals at either end of the display. In addition, the spacing between electrodes is set to be as close to the diameter of particles as is possible consistent with proper particle rotation, resulting a monolayer display. The Crowley patent achieved a display with a closely packed monolayer having a light reflectance that surpasses that of the multi-layer displays in the prior art. The Crowley patent achieved a display with a closely packed monolayer having a light reflectance that surpasses that of the multi-layer displays in the prior art. The display in Crowley, however, achieves a higher packing density by sacrificing structural integrity.

The Crowley display lacks internal support and has insufficient sealing. Particularly, the display will not work when placed vertically.

More fundamentally, even with the above improved methods making twisting particle displays the particles cannot be packed together to completely fill the area of the display because of the existence of interstices. Furthermore, regardless of which microstructure is used, and regardless of how the particles are packed, the particles often do not exactly rotate to the precise orientation to have only the side with the desired optical characteristics facing the viewer. Both partial filling and partial rotating contribute to decreased image contrast in the following manner: Gyricon displays use optically anisotropic particles that are selectively rotatable to communicate visual information. For example, in a display using bichromal spherical balls where each ball defines a display unit which conveys the characteristic color information of the spherical ball's hemisphere which is selectively turned to face the viewer, the unit display area is typically the projection area or image size of the ball. Due to the unfilled spaces between the particles and also due to imperfect rotation which may show wrong color or portions of contrasting (hence cancelling) colors, each particle is surrounded by a peripheral area which does not carry any color information of the particle selectively rotated. Instead the peripheral area substantially reflects the optical characteristic of the substrate which is typically dark. This phenomenon causes decreased contrast. The same phenomenon exists in displays where each unit display is defined by multiple particles.

BRIEF SUMMARY OF THE INVENTION

The present invention uses assisting optical elements to enhance or improve an optical effect of a microstructure, such as contrast of visual displays (e.g., a gyricon display). The assisting optical elements may be either reflective or refractive. To enhance contrast of a visual display, for example, an assisting optical element is placed over or around each display unit to form an enlarged image of at least a portion of the upper side of the particles in that display unit so that the effective unit display area is larger than the actual unit display area. The actual unit display area is defined by the physical sizes of the particles. For example, in a display of one particle per pixel, when the entire particle is visible to the viewer from above, the actual unit display area is the actual size of the particle.

Assisting optical elements of various designs maybe used to achieve the above purpose. A reflective corona shouldering a particle, for example, creates an appearance of the surface of the particle larger than the actual size of the surface through reflection of the light from surface, given that the reflective corona is larger than the particle. A reflective corona may simply be made of metalized reflective surfaces, or alternatively formed by using the principle of total internal reflection in which a total reflection is created at an interface of two different materials at certain incident angles of the light, even though the interface is not made of a material which is highly reflective in ordinary sense. Alternatively, optical lenses may be used to form enlarged images of the surface of each particle when viewed from above. In this case, the light from the surface of the particle is spread to the peripheral area through refraction instead of reflection.

BRIEF DESCRIPTION OF THE DRAWINGS

The present invention will be further explained with reference to the drawing figures listed below, wherein like structure is referred to by like numerals throughout the several views.

While the above-identified drawing figures set forth several preferred embodiments of the invention, other embodiments are also contemplated, as noted in the discussion. In all cases, this disclosure presents the present invention by way of representation and not limitation. It should be understood that numerous other modifications and embodiments can be devised by those skilled in the art which fall within the scope and spirit of the principles of this invention.

DETAILED DESCRIPTION

1. General Aspects of the Invention

The invention will now be described with reference to the drawings. For convenience, the drawing figures depict a reflective gyricon display with each assisting optical element being associated with one spheroidal gyricon particle. The inventive structure in accordance with the present invention, however, may also be used to enhance or create certain optical effects in other types of microstructures. Generally, any microstructure that contains a responsive element having a certain optical aspect by modulating or interacting with an incident electromagnetic wave and giving rise to an identifiable optical effect may use the assisting optical element of the present invention to improve or enhance the optical effect. For example, where elements having optical aspects pertaining to electromagnetic waves other than a visible light are used, the inventive microstructure may be used as a device for optical purposes other than visual displays. Examples for such applications include but are not limited to microwave reflectors and absorbers, IR reflectors and absorbers, and configurable radio wave antennas and reflectors. In the case where the electromagnetic wave is a visible light, applications of the present invention include but not limited to visual displays using microstructures containing a visual display element. A visual display element can be anything that carries certain visual information.

Particularly, the element having an optical aspect may be optically anisotropic (i.e., having two or more optical aspects) and capable of switching among the optical aspects in response to external signal. The twisting particles or rotating balls used in gyricon displays are examples of such responsive elements having an optical anisotropy.

Visual displays that may use the inventive structures containing assisting optical elements typically contain multiple display units, each display unit including one or more responsive elements as display elements. Besides gyricon displays, examples of such visual displays include but not be limited to displays based on the electrophoretic principle such as electronic ink made by E Ink Corp.

Furthermore, when used with a gyricon display, the inventive structure is not limited to uses with reflective gyricon displays but may also be used with a transmissive gyricon display or a retroreflective gyricon display. In addition, each assisting optical element may be associated with a display unit that consists of multiple gyricon particles, and the particles may be of geometric shapes other than balls. As described in U.S. Pat. Nos. 4,126,854; 5,389,945; 6,055,091; and 6,128,124 and European Patent No. EP0902410, which patents are hereby incorporated herein by reference, when a gyricon display is addressed using electrodes, the display consists of multiple pixels of certain desired density, each pixel being distinguished from other pixels by its addressing. In the case of a color display, each pixel further consists of multiple subpixels (generally three subpixels, each representing an elemental color). Each pixel or subpixel may consist of a single gyricon particle, or multiple gyricon particles. Unless specified otherwise in the context, the present application uses the term "display unit" to present a unit on the display substrate containing a single particle or a group of particles in which group the displays of the particles are addressed in an additive mode (i.e., the display of each particle is designed to be mixed with the displays of the rest of the particles in the same group). Such a group may be a pixel in a black-and-white display, or either a pixel or a subpixel in a color display.

Figure 1A:
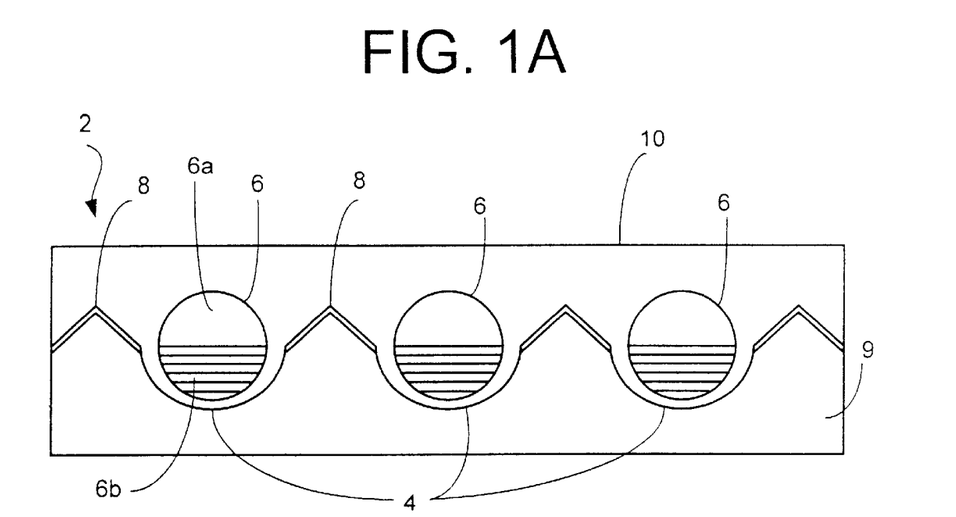
FIG. 1A is a side sectional view of a monolayer black and white gyricon display according to the present invention where the display comprises a plurality of similar or identical display units.

With reference to FIG. 1A, a gyricon display 2 comprises a plurality of repetitive display units 4. Each display unit comprises a gyricon particle 6 (a spherical ball as shown) and an assisting optical element 8. Each particle 6 has two optically distinct sides 6a, 6b, one facing the viewer (not shown) above and the other facing away from the viewer.

Figure 1B:
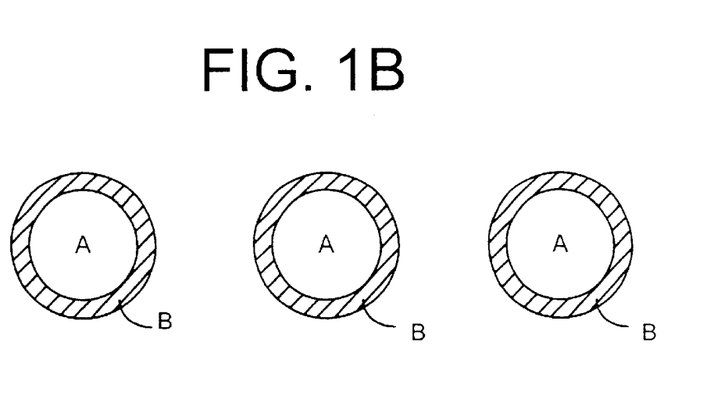
FIG. 1B is a partial top view of the display in FIG. 1.

With reference to FIG. 1B, the viewer from above sees an top image of each display unit 4. When an optically anisotropic particle 6 is selectively rotated, the side facing the viewer has a dominant color. This is often true even if the rotation is imperfect to a certain extent. Without assistance of an assisting optical element 8, each display unit 6 has an effective display area A which is typically the projection area or image size of the ball. Due to the unfilled spaces between the particles, each particle is surrounded by a peripheral area B. Without assistance of an assisting optical element, the peripheral area B does not carry any color information of the particle selectively rotated, instead it reflects the optical characteristic of the substrate which is typically dark. Where the peripheral area B is substantial as compared to display area A, contrast of the display decreases. In addition, incomplete or over rotation also lowers contrast by contributing to area B due to showing portions of contrasting colors instead of a single dominant color.

The assisting optical element 8 helps to enhance the contrast. With the assisting optical element 8, the dominant color of the particle side facing the viewer is spread or diffused into the peripheral area through either reflection or refraction. As a result, when viewed through the assisting optical element, the viewer sees an image of the display unit larger than the actual size of the particle.

The enlarged image has the same dominant color as that of top side 6a of the corresponding particle.

In addition to contrast enhancement, other display qualities such as a wider viewing angle or a wider incident light receiving angle maybe achieved by engineering various proper optics.

Description of several preferred embodiments according to the spirit of the invention follows.

2. Preferred Embodiments

Figure 2:
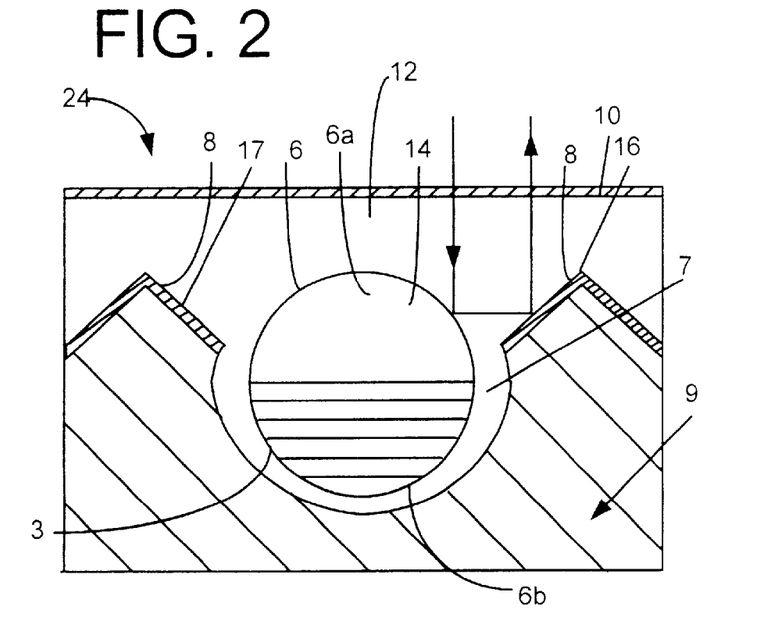
FIG. 2 is a side sectional view of a single display unit in a first embodiment according to the present invention where the assisting optical element is a conical reflective corona shouldering the particle.

With reference to FIG. 2, a single display unit 4 in one embodiment according to the present invention includes a micro-structured base 5 defining a cavity 3. A spherical ball 6 is positioned within the cavity 3. The ball 6 has a white hemisphere 6a and a black hemisphere 6b, the white hemisphere 6a presently facing the viewer (not shown) viewing from above. A fluid layer 7 surrounds the ball 6 and facilitates rotation of the ball 6. A top cover layer 10 and a layer of transparent filler material 12 are disposed above the ball 6. An assisting optical element 8 in this embodiment comprises a conical corona (full view not shown) surrounding an upper portion 14 of the ball 6, the conical corona having a reflector surface layer 17. The reflector surface layer 17 can be any reflective surface known in the art, such as a metalized surface or a polymeric reflector surface.

As further shown in FIG. 2, a light ray 5 of ambient light reflects from a portion of the white hemisphere 6a. Light ray 5 is then reflected by the reflector surface 17 and travels to the viewer above. Due to the reflection, the assisting optical element 8 effectively forms an enlarged image of the upper portion 14 of the ball 6. In the present application, the term "image" is used broadly to mean a visual appearance to a viewer looking through the assisting optical element. Specifically, the term "image" does not necessarily suggest that a sharply focused optical image is formed.

Although in the above illustrated embodiment, the particle 6 is a spherical ball, particles of other geometrical shapes may be used and the shape of the assisting optical element is adjusted accordingly. Cylindrical bichromal particles disclosed in U.S. Pat. No. 6,055,091 (Sheridon, "Twisting-Cylinder Display"), for example, can also be used in the present invention if the shapes of cavities 3 and the assisting optical elements 8 are adjusted accordingly. The above Sheridon patent is hereby incorporated herein with reference.

The cover layer 10 is supported by the filler material 12. The filler material 12 accordingly spaces the cover layer 10 from the top end 16 of the cavity 3 and gives support to the cover layer 10. Besides being a support for the top layer 10, the filler material 12, when properly selected and applied, helps to create bistability of the gyricon particles 6. Alternatively, the filler material 12 may be placed lower than the top end 16 of the cavity 3 and/or partially fills the cavity 3 so that the filler material 12 only helps to create bistability of the gyricon particles 6 but does not give support to the cover layer 10. In that case, the cover layer 10 maybe placed directly over the substrate and supported by the top end 16 of the cavity 3. This inventive feature of using the filler material 12 to create bistability is not found in the prior art. Accordingly, the structures disclosed in U.S. Pat. Nos. 5,815,306 and 5,777,782, for example, do not have bistability as described herein. In addition, the filler material 12 may have a distinct optical property such as a light dispersion effect or an index number different from that of the air. In that case the filler material 12 may itself be the assisting optical element 28 or be a part of the assisting optical element 28. Alternatively, the filler material 12 may be omitted. Omitting the filler material 12 may lose the benefit of a useful method to create bistability but the inventive structure in accordance with the present application can still have enhanced contrast as long as a proper assisting optical element 28 is provided.

Where a filler material 12 is used, the assisting optical element 8 can be made to work without using a reflective surface layer 17 as illustrated in the next example.

Figure 3:
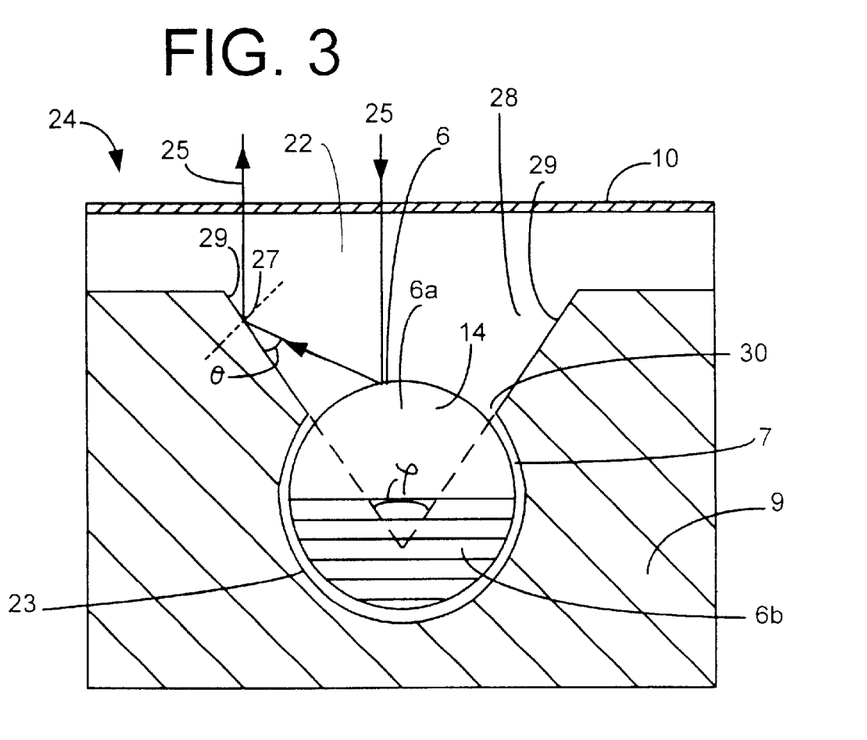
FIG. 3 is a side sectional view of a single display unit in a second embodiment according to the present invention where the assisting optical element includes a high index filler material to form total internal reflection.

With reference to FIG. 3, there is a single display unit 24 in another embodiment according to the present invention. An assisting optical element 28 in this embodiment comprises a conical corona 29 (full view not shown) substantially above the ball 6. The conical corona 29 having a surface 27 interfacing with the filler material 22. The surface 27 shall also be called interface 27 hereinafter depending on the context. The shape of the conical corona 29 is defined by a conical angle φ. The surface 27 has an index of refraction n1. The filler material 22 has a index of refraction n2 which is greater than n1.

As further shown in FIG. 3, a top portion 14 of the ball 6 is exposed to incoming light from above and is visible to the viewer from above. A light ray 25 from ambient light reflects from the top portion 14 of the white hemisphere 6a and reaches the interface 27 at an incident angle θ. According to the law of refraction (Snell's law), if θ≦θc, where θc is the critical angle determined by sin(90°−θc)=n1/n2, total internal reflection occurs at the interface. According to the above condition of total internal reflection, a greater difference between n2 and n1 gives a greater critical angle θc. Because the total internal reflection occurs when θ≦θc, a greater critical angle θc means that, for a given conical angle φ of the conical corona, more light from the top portion 14 of the white hemisphere 6a will meet the condition of total internal refraction. That is, a greater difference between n2 and n1 results in more total internal reflection.

In addition and operating independently, a greater conical angle φ of the conical corona itself also results in a condition where more light from the top portion 14 of the white hemisphere 6a will be totally reflected at the interface 27. This is because the greater the conical angle φ is, the smaller the incident light angle θ is, making it more likely to satisfy the total internal reflection condition θ≦θc.

As the conical angle φ becomes greater, however, more outgoing light after total internal reflection will reach a viewer from above at an inconvenient viewing angle, making the display less practical. Due to these competing factors, the design of the assisting optical element, particularly the angle φ of the conical shape, will be a compromise. On one hand, when φ is large enough, light from substantially all areas on the top portion 14 can form total internal reflection at substantially all areas on the interface 27. On the other hand, when angle φ is too large, the light 25 leaving the interface 27 upon an occurrence of total internal reflection will no longer travel at a direction substantially close the vertical line perpendicular to the cover layer 10. Because the normal viewing position is from above the display, i.e., at aright angle to the cover layer 10, as less and less outgoing light comes at the right angle, the benefit of the assisting optical element according to the present invention will decrease. Optimization will depend on many factors, such as the desirable range of the viewing angle, the degree of the required peripheral compensation by the assisting optical element, and the difference between the index of refraction n1 of the surface 27 and the index of refraction n2 of the filler material. The preferred range of the conical angle φ is 45°–90°.

Where a satisfactory amount of total internal refraction occurs at a range of the desirable angles, the assisting optical element 28 effectively forms an enlarged image of the upper portion 14 of the ball 6.

As further shown in FIG. 3, the cavity 3 partially encloses the top portion 14 of the ball 6. The cavity 3 thus leaves an aperture 30 that is smaller than the diameter of the ball 6. In addition, FIG. 3 also illustrates an incomplete rotation of the ball 6 where the selected hemisphere (e.g., the white hemisphere 6a) did not rotate to an exact upright position such as in FIG. 1.

An incomplete rotation will result in a decrease of contrast because in such a condition less selected color information (white as shown) is communicated to the viewer. This is due to the fact that not only a smaller area having the selected color (white) faces the viewer, but also that the selected color information is further decreased by a portion of the opposite color that still faces the viewer due to an incomplete rotation. The design according to FIG. 3, however, effectively compensates the loss of information caused by an incomplete rotation. The aperture 30 cuts off the portion of the unselected color. The assisting optical element 28, which includes the interface between the surface 27 of the conical corona 29 and the filler material 22, enlarges the image of the remaining top portion 14 which has the selected color (white as shown) only.

The above partial enclosing design of FIG. 3 may also be used in the metal reflector model as shown in FIG. 2.

Figure 4:
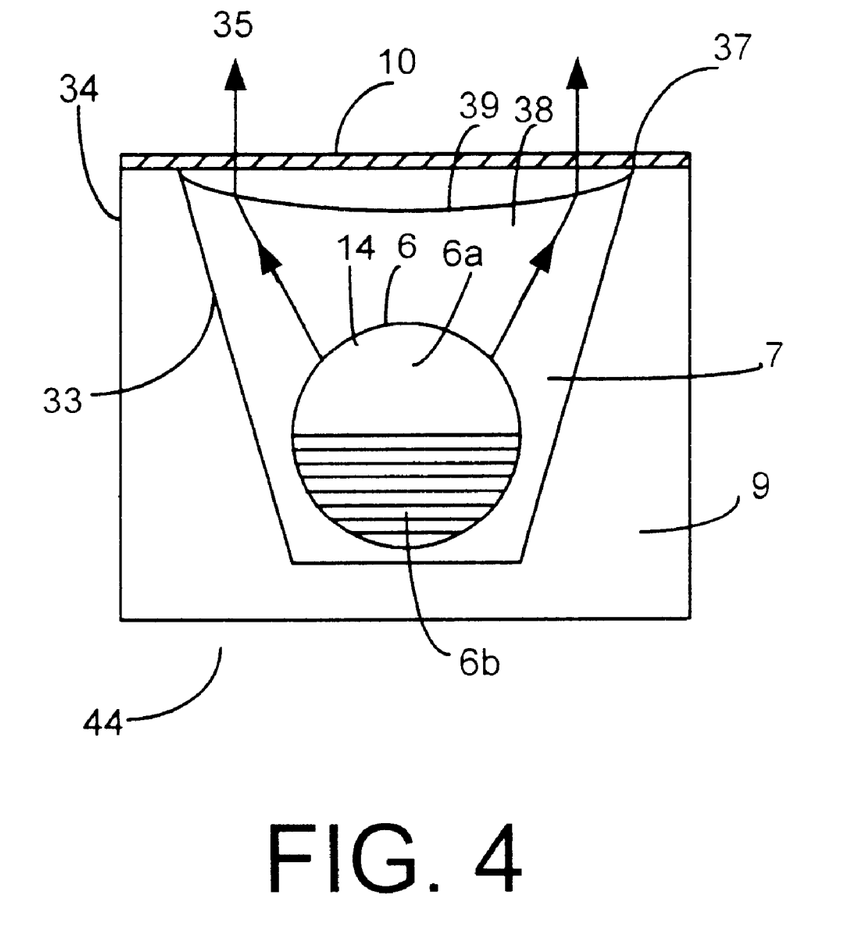
FIG. 4 is a side sectional view of a single display unit in a third embodiment according to the present invention where the assisting optical element includes a converging lens.

With reference to FIG. 4, a single display unit 4 in a third embodiment according to the present invention includes a converging lens 38 disposed at the top perimeter edge 37 of the cavity 33. Instead of enlarging through reflectance this embodiment enlarges through a lens structure. The converging lens 38 forms an enlarged image of the upper portion (white hemisphere 6a as shown) of the ball 6 as explained below. Enlarging through a lens structure is in contrast to the lens structure of the Sheridon U.S. Pat. No. 5,777,782, which is merely a supplemental focusing tool to focus light through small apertures on a transmissive display.

When placed properly in relation to an object, a converging lens may form an enlarged image of the object. When the object is placed within the focus length of the converging lens, for example, the viewer from the other side of the lens will see an enlarged image of the object formed on the same side as the object relative to the lens. With reference to FIG. 2, if the top hemisphere 6a of the ball 6 is located within the focal length of the converging lens 38, an enlarged image of the top hemisphere 6a will be formed on the same side as the ball 6 (i.e., the opposite side to the viewing side) relative to the lens to a viewer from above.

If the enlargement is sufficient to cover a substantial amount of the peripheral area around the ball 6, the contrast of the display will be enhanced. The amount of enlargement, however, should not be excessive. An over-enlarged image starts to blur with the images of adjacent balls 6 and will lead to decreased resolution of the display.

The degree of enlargement is determined by the focal length of the converging lenses 8 and the distance between the top hemisphere 6a and the lens 38. The maximum amount of enlargement without blurring the display is determined by the size of the peripheral area around each ball 6. To optimize the display, it is therefore important to be able to control the focal length of the lenses 38 and the sizes of the cavities 3 in the process of manufacturing the display.

In FIG. 4, the converging lens 38 is spaced from the rotating ball 6 and the space therebetween is filled with entrapped air (not shown). Alternatively, a transparent filler material may be used.

The cavity 33 has a smooth and continuous conical shape. Alternatively, other geometric shapes of the cavity 33, such as the two-portion design in FIG. 2 and FIG. 3. Conversely, the assisting optical elements 8 and 28 illustrated in FIGS. 2 and 3 may also be combined with the converging lens 38. Additionally, the partial enclosing design illustrated in FIG. 3 may also be used in the converging lens model in FIG. 4 in this application. Further features related to using an assisting lens element to enhance display are disclosed in the commonly-owned U.S. patent application titled "Microstructures with Assisting Optical Lenses" and filed concurrently (Attorney Docket Number M507.12-17). The disclosure of the above-identified patent application is hereby incorporated herein by reference. The above-identified application particularly discloses a preferred method of fabricating a lens structure. In the spirit of the present application, however, the inventive assisting optical element does not depend on a particular method of fabrication. Various methods known in the art may be used to make a lens structure that forms an enlarged image of a display portion of an associated display element.

FIGS. 2–4 all illustrate a single display unit. The actual visual display comprises a two-dimensional array of such single display units. FIG. 1A, for example, illustrates a partial sectional view of a monolayer black and white gyricon display according to the present invention where the gyricon display 2 comprises a plurality of display units 4. Each display unit 4 has an assisting optical element 8 which includes a conical reflective corona shouldering a particle 6.

3. Method of Manufacture

To make a gyricon display in accordance with the present invention, a substrate 9 containing cavities 3, 23, or 33 must first be made. The display in the Crowley patent does not have a substrate containing cavities and is therefore not suitable for implementing the improvement according to the present invention. In addition, the display in the Crowley patent has two other potential problems. First, the display package is environmentally and mechanically sealed only around the perimeter of the display. This results in the package being susceptible to cracking as may result from wear and tear; in this instance, a single crack would be adequate to enable all of the dielectric oil to drain or evaporate away, thereby disabling the function of the display. Additionally, the package is susceptible to buckling, and the elastomer-particle film can sag or slide out of position because of gravity (especially when held vertically for long periods of time, such as for display signs). This is because the mechanical support for the package is primarily the thin polymer films on the front and back sides, and because the reinforcement of these films occurs only where they are bonded together along the periphery.

Elastomer matrix structures in prior art maybe used for the purpose of the present invention. The assisting optical elements 8, 28, or 38 may be formed directly on the elastomer substrate if the elastomer, with or without the combination of particles, has a surface structure that facilitates forming an assisting optical element. In most conventional elastomeric structures, however, the cavities and particles are largely enclosed and located inside the elastomer and therefore have no surface openings, making it difficult to fabricate an optical structure of this application directly on the elastomer matrix structure. Alternatively, the assisting optical elements 8, 28, or 38 maybe pre-formed separately and then placed over the elastomers substrate. For example, an array of assisting optical elements 8, 28, or 38 may be preformed on a plate which is either separate or combined with the top plate that also has the addressing electrodes. Elastomer matrix structures, however, have cavities that are randomly formed with irregular shapes and locations, making it difficult to register preformed assisting optical elements with the display units (pixels or subpixels). Furthermore, where each cavity represents a pixel or subpixel, there must be proper indexing or registration in the alignment between the addressing electrodes and each cavity. The above difficulties in registration and alignment result in high costs in making a display. U.S. Pat. No. 5,777,782 to Sheridon is an example for a structure with such limitations. Such problems do not exist or are not as severe in the structures disclosed in U.S. Pat. No. 6,128,124 to Silverman in which each pixel or subpixel consists of multiple cavities containing gyricon particles. In Silverman patent, the gyricon particles and the associated cavities have a dimension smaller than that of each pixel or subpixel and may be randomly positioned. The pixels or subpixels on the display are defined at locations where the addressing electrodes happen to be, requiring no indexing or registration in the alignment between the addressing electrodes and each cavity. The structure in Sheridon patent '782, however, cannot be applied to Silverman patent '128. In Sheridon, because a lens is used to focus light through a small aperture on the corresponding particle and every particle has its own aperture in order for the transmissive display in accordance with the patent to function, each particle must have a designated lens. Such intended functional requirements make any random alignment between the lenses and the particles and multiple particles per lens structure inherently unsuitable.

An exemplary preferred method of making a pre-formed substrate 9 containing cavities 3, 23, or 33 is described in details in the commonly-owned U.S. patent application titled "Post and Pocket Microstructures for Movable Particles Having an Optical Effect" and filed concurrently (Attorney Docket Number M507.12-14). The disclosure of the above-identified patent application is hereby incorporated herein by reference.

The concepts and the methods of manufacture disclosed in that application maybe used to preform a substrate 9 containing cavities 3, 23, or 33 that have proper geometric shapes and pattern to accommodate both optically anisotropic particles such as gyricon particles and assisting optical elements. As described in that application, the post and pocket microstructures have many other advantages. Particularly, the pocket and post structure has a surface structure such as the cavities which are open from the top during manufacturing. Such a structure accommodates the process of adding or directly forming an optical element on the substrate. Additionally, where a dielectric fluid is needed such as in a gyricon display using rotatable particles, the dielectric fluid does not need to diffuse through an elastomer. This allows a much greater variety of dielectric fluids to be used than in the case for the swollen elastomer sheets.

With an above preferred preformed substrate 9, assisting optical elements 8, 28, or 38 may be included in the following two different ways: 1) preforming the assisting optical elements separately (e.g., formed on a top plate that also has the addressing electrodes) and then placing them over the substrate, and, 2) forming the assisting optical elements directly or integrally on the elastomer substrate. As used in the present application, a process of "directly forming in assisting optical element on the substrate" means a process that involves more than simple placement of a pre-formed assisting optical element on the substrate or making necessary physical connections between an assisting optical element and the substrate. However, the second alternative is preferred because when a preformed substrate disclosed in the above identified patent application is used, forming of the substrate and forming of the assisting optical elements may be made one single integrated manufacturing process to improve efficiency and lower the cost. Additionally, integrated manufacturing process provides an intrinsic solution to the difficult problem of exact indexing or registration between each assisting optical element and its corresponding display unit.

The method of making a reflective surface 17 such as a metalized surface is well known in the art. The method of adding a filler material is also well know in the art. The top cover 10 is preferably non-reflective to avoid interference with the functions of the optical elements 8, 28, or 38.

Although the present invention has been described with reference to preferred embodiments, workers skilled in the art will recognize that changes may be made in form and detail without departing from the spirit and scope of invention. All U.S. patents referred in this disclosure are incorporated by reference herein.

What is claimed is:

1. A structure to interact with electromagnetic waves by changing optical aspects in selected areas responsive to an external signal, the structure comprising:

a substrate comprising a two-dimensional array of cavities;

a plurality of responsive elements disposed in the cavities, and when so placed, each responsive element capable of presenting at least two different optical aspects and changing between the optical aspects based on an applied external signal; and an optical structure containing a plurality of assisting optical elements, each assisting optical element being formed directly on the substrate and associated with a display unit, and each assisting optical element improving a presented optical aspect from at least a portion of each responsive element belong to the corresponding display unit, wherein:

the optical structure is a surface structure, each assisting optical element comprising a reflective corona reflecting an electromagnetic wave from the responsive element or responsive elements associated with the assisting optical element, and wherein the reflective corona has a corona surface, the corona surface and a surrounding medium form a contacting interface, the corona surface further has a conical angle which opens upward, the angle being such that total internal reflection is formed at the interface with respect to a viewer viewing from above at a substantially normal angle.

2. The structure of claim 1, wherein the structure is a visual display and the responsive elements are optically anisotropic pertaining to a visible light.

3. The structure of claim 1, wherein the external signal is an electromagnetic field.

4. The structure of claim 1, wherein the responsive elements are rotating particles.

5. The structure of claim 4, wherein the particles are spheroid balls.

6. The structure of claim 1 wherein the substrate is three-dimensionally microfabricated.

7. The structure of claim 1, wherein each assisting optical element is associated with only one responsive element.

8. The structure of claim 1, wherein each responsive element has an element size, wherein:

the reflective corona defines an opening, the opening being generally larger than the element size.

9. The structure of claim 1, wherein the reflective corona comprises a metalized reflector surface.

10. A structure to interact with electromagnetic waves by changing optical aspects in selected areas responsive to an external signal, the structure comprising:

a substrate comprising a two-dimensional array of cavities;

a plurality of responsive elements disposed in the cavities, and when so placed, each responsive element capable of presenting at least two different optical aspects and changing between the optical aspects based on an applied external signal;

an optical structure containing a plurality of assisting optical elements, each assisting optical element being formed directly on the substrate and associated with a display unit, each assisting optical element improving a presented optical aspect from at least a portion of each responsive element belong to the corresponding display unit, wherein the optical structure is a surface structure, each assisting optical element comprising a reflective corona reflecting an electromagnetic wave from the responsive element or responsive elements associated with the assisting optical element, and a transparent filler material placed over the top of each display unit, wherein:

the reflective corona has a corona surface, the corona surface being surrounded by the filler material, the filler material having an index of refraction higher than the index of refraction of the corona surface, and the corona surface and the filler material form a contacting interface, the corona surface further having a conical angle which opens upward, the angle being such that total internal reflection is formed at the interface with respect to a viewer viewing from above at a substantially normal angle.

11. A structure to interact with electromagnetic waves by changing optical aspects in selected areas responsive to an external signal, the structure comprising:

a substrate comprising a two-dimensional array of cavities;

a plurality of responsive elements disposed in the cavities, and when so placed, each responsive element capable of presenting at least two different optical aspects and changing between the optical aspects based on an applied external signal;

an optical structure containing a plurality of assisting optical elements, each assisting optical element being formed directly on the substrate and associated with a display unit, each assisting optical element improving a presented optical aspect from at least a portion of each responsive element belong to the corresponding display unit, wherein:

the optical structure is a surface structure, each assisting optical element comprising a reflective corona reflecting an electromagnetic wave from the responsive element or responsive elements associated with the assisting optical element, the responsive elements are rotating particles having a particle size, and the substrate defines receiving positions receiving particles, each receiving position further having a first viewing aperture which is smaller than the particle size.

12. The structure of claim 11, wherein:

the reflective corona is positioned substantially above the particle, and the reflective corona further defines a second viewing aperture which is greater than the first viewing aperture.

13. The structure of claim 1, wherein a top cover is laid across the substrate and the responsive elements contained therein, the top cover being transparent and non-reflective with respect to the electromagnetic wave.

14. The structure of claim 1, wherein the responsive elements are rotating particles, the structure further comprising a filler material at least partially surrounding each particle.

15. The structure of claim 14, wherein:

the filler material exerts a force on the particles, the force being sufficient to keep the particles bistable but not excessive as to prevent the particles from rotating upon the application of the electromagnetic field.

16. A visual display apparatus comprising:
a substrate comprising a two-dimensional array of cavities;
a plurality of optically anisotropic particles disposed in the cavities, and when so placed, each particle having a visible side facing a viewer, each display particle capable of presenting at least two different optical aspects and changing between the optical aspects based on an applied electromagnetic field; and
a plurality of assisting optical elements, each assisting optical element being formed directly on the substrate and associated with a display unit, each assisting optical element enlarging an image from at least a portion of each particle belong to the corresponding display unit, wherein:
each cavity extends from a bottom end to a top end, with at least a portion of the assisting optical element being below the top end of the cavity.

17. The visual display apparatus of claim 16, wherein each display unit has no more than one particle.

18. The visual display apparatus of claim 16, wherein the top end of each cavity has a substantially continuous perimeter.

19. The visual display apparatus of claim 16, wherein each cavity contains no more than one particle.

20. The visual display apparatus of claim 16, wherein each assisting optical element is substantially below the top end of the cavity.

21. The display of claim 16, further comprising a filler material at least partially surrounding each particle.

22. The display of claim 21, wherein:
the filler material exerts a force on the particles, the force being sufficient to keep the particles bistable but not excessive as to prevent the particles from a rotating upon the application of the electromagnetic field.

23. The display of claim 16, further comprising a top cover laid across the supporting structure and the responsive element contained therein, the top cover being transparent and non-reflective.

24. The display of claim 16, further comprising a transparent filler material placed over the top of each display unit.

25. A visual display apparatus comprising:
a substrate comprising a two-dimensional array of cavities;
a plurality of optically anisotropic particles disposed in the cavities; and
a plurality of assisting optical elements, each assisting optical element being formed directly on the substrate in connection with a cavity enlarging an image from at least a portion of each particle belong to the corresponding display unit;
wherein:
each cavity, the particle or particles contained therein, and the associated assisting optical element together define a display unit;
each particle, when placed within the cavity, has a visible portion facing a viewer, each display particle capable of presenting at least two different optical aspects and changing between the optical aspects based on an applied electromagnetic field, the visible portion having a vertical projection area, the vertical projection area defining a particle display area;
each cavity has a top end defining an opening, the opening defining a unit display area corresponding to the display unit, the unit display area being substantially proportional to but larger than the sum of the particle display areas of the particles associated with the corresponding display unit; and
the assisting optical element comprises a reflective surface of a top portion of each cavity, the top portion being near the top end of the cavity, the reflective surface being reflective of the incident light, the reflective surface further having a conical shape extending from a lower height to an upper height, with at least a part of the reflective surface being abreast with an upper portion of the particle or particles disposed in the cavity, the conical shape of the reflective surface defining a first aperture at the lower height from which aperture the upper portion of the particle is exposed to a viewer, the conical shape of the reflective surface further defining a second aperture at the upper height, the second aperture being larger than the first aperture.

26. The visual display apparatus of claim 25, wherein the reflective surface comprising a metalized reflector layer.

27. The visual display apparatus of claim 25, wherein conical shape of the reflective surface having a conical angle of 45°–135°.

28. The visual display apparatus of claim 25, further comprising a filler material at least partially surrounding each particle.

29. The visual display apparatus of claim 28, wherein:
the filler material exerts force on the particles, the force being sufficient to keep the particles bistable but not excessive as to prevent the particles from a rotating upon the application of the electromagnetic field.

30. The visual display apparatus of claim 25, wherein:
the assisting optical element comprises a filler material contained in an upper portion of the cavity, the upper portion of each cavity having an inner surface contacting the filler material, and when so contacting, forming an interface in the contacting area, the filler material having an index of refraction lower than that of the material of the inner surface of the upper portion of the cavity;
the inner surface having a conical shape of a certain angle, so that total internal reflection is formed at the interface between the filler material and the inner surface of the upper portion of the cavity with respect to a viewer viewing from above at a substantially normal angle.

31. The visual display apparatus of claim 30, wherein the upper portion of each cavity being substantially above the particle disposed in the cavity.

32. The visual display apparatus of claim 30, wherein:
each particle has a particle size;
the cavity extends from the bottom to a middle height and partially encloses at the middle height, leaving an opening substantially proportional to but smaller than the particle size of the particle contained in the cavity.

33. The visual display apparatus of claim 32, wherein:
the cavity is divided at the middle height into a lower portion of and an upper portion, the upper portion being separately laid over the lower portion.

34. A method of making a structure to interact with electromagnetic waves, the method comprising:
making a substrate, the substrate having a plurality of cavities;
placing a plurality of optically anisotropic particles in the cavities, when placed in the cavities, each particle capable of presenting at least two different optical aspects and changing between the optical aspects based on an applied electromagnetic field; and forming an assisting optical element directly on the substrate, each assisting optical element enlarging an image from at least a portion of each particle associated with the optical element, wherein:
   each cavity extends from a bottom end to a top end, with at least a portion of the assisting optical element being below the top end of the cavity.

35. The method according to claim 34, wherein the structure is a visual display and the particles are optically anisotropic pertaining to a visible light.

36. The method according to claim 34, further comprising:
   adding a filler material into each cavity, the filler material being selected and positioned so that the filler material exerts a force on the particles, the force being sufficient to keep the particles bistable but not excessive as to prevent the particles from a rotating upon the application of the electromagnetic field.

37. The method according to claim 34, wherein the step of forming the assisting optical element comprises:
   metalizing an upper surface portion of each cavity.

38. The method according to claim 34, wherein the step of forming the assisting optical element comprises:
   placing a reflective shoulder over each cavity.

39. The method according to claim 34, wherein the step of forming the assisting optical element comprises:
   adding a filler material in a top portion of each cavity, the filler material being transparent and having an index of refraction greater than that of the surface material of the top portion of the cavity.

40. A method of making a visual display apparatus, the method comprising:
   making a substrate, the substrate having a plurality of cavities;
   placing a plurality of optically anisotropic particles in the cavities, when placed in the cavities, each particle having a visible side, each display particle capable of presenting at least two different optical aspects and changing between the optical aspects based on an applied electromagnetic field;
   adding an assisting optical element on the substrate, each assisting optical element being individually connected to a display unit, each assisting optical element enlarging an image from at least a portion of the visible side of each particle belong to the corresponding display units wherein each cavity extends from a bottom end to a top end, with at least a portion of the assisting optical element being below the top end of the cavity; and
   making the visual display apparatus optically non-transmissive.

41. The method of claim 40, wherein:
   adding an assisting optical element on the substrate comprises directly forming the assisting optical element on the substrate.

42. The method of claim 40, wherein:
   making the visual display apparatus optically non-transmissive comprises adding an opaque bottom layer or plate to a side of the substrate.

* * * * *